(12) United States Patent
Lorentz

(10) Patent No.: US 6,644,717 B2
(45) Date of Patent: Nov. 11, 2003

(54) RAISED HATCH DOOR SYSTEM

(75) Inventor: Thomas W. Lorentz, E. Amherst, NY (US)

(73) Assignee: Main Mobility Inc., Clarence, NY (US)

( * ) Notice: Subject to any disclaimer, the term of this patent is extended or adjusted under 35 U.S.C. 154(b) by 0 days.

(21) Appl. No.: 10/174,162

(22) Filed: Jun. 18, 2002

(65) Prior Publication Data

US 2002/0190538 A1 Dec. 19, 2002

Related U.S. Application Data

(60) Provisional application No. 60/299,336, filed on Jun. 19, 2001.

(51) Int. Cl.$^7$ .................................................. B60J 5/04
(52) U.S. Cl. .................................. 296/146.4; 296/146.5
(58) Field of Search .............................. 296/56, 146.1, 296/147, 149, 151, 146.4, 146.11, 146.5, 26.04, 210, 213; 49/502, 503, 170, 171; D12/401, 404; 29/401.1; 414/921

(56) References Cited

U.S. PATENT DOCUMENTS

| | | | | |
|---|---|---|---|---|
| 577,960 A | * | 3/1897 | Jacobs ........................ | 296/106 |
| 2,973,221 A | * | 2/1961 | Blackman ................. | 296/146.4 |
| 3,907,357 A | * | 9/1975 | Davis, Jr. ................. | 296/146.5 |
| 5,577,793 A | * | 11/1996 | Kobasic ................... | 296/146.4 |
| 6,022,066 A | * | 2/2000 | Tremblay et al. ......... | 296/146.5 |
| 6,071,064 A | * | 6/2000 | Hackett ...................... | 414/921 |
| 6,149,218 A | * | 11/2000 | Tremblay et al. ......... | 296/26.04 |
| 6,299,243 B1 | * | 10/2001 | Gerald, Sr. ................. | 296/210 |
| 2002/0005650 A1 | * | 1/2002 | Rogers et al. ................ | 296/56 |

* cited by examiner

Primary Examiner—D. Glenn Dayoan
Assistant Examiner—Jason Morrow
(74) Attorney, Agent, or Firm—Hodgson Russ LLP

(57) ABSTRACT

A raised hatch door system for use with the pivoting side doors of an extended height van. The hatch door system engages with standard sized van doors and in the closed position provides a structural header that aligns substantially with the factory installed header.

19 Claims, 9 Drawing Sheets

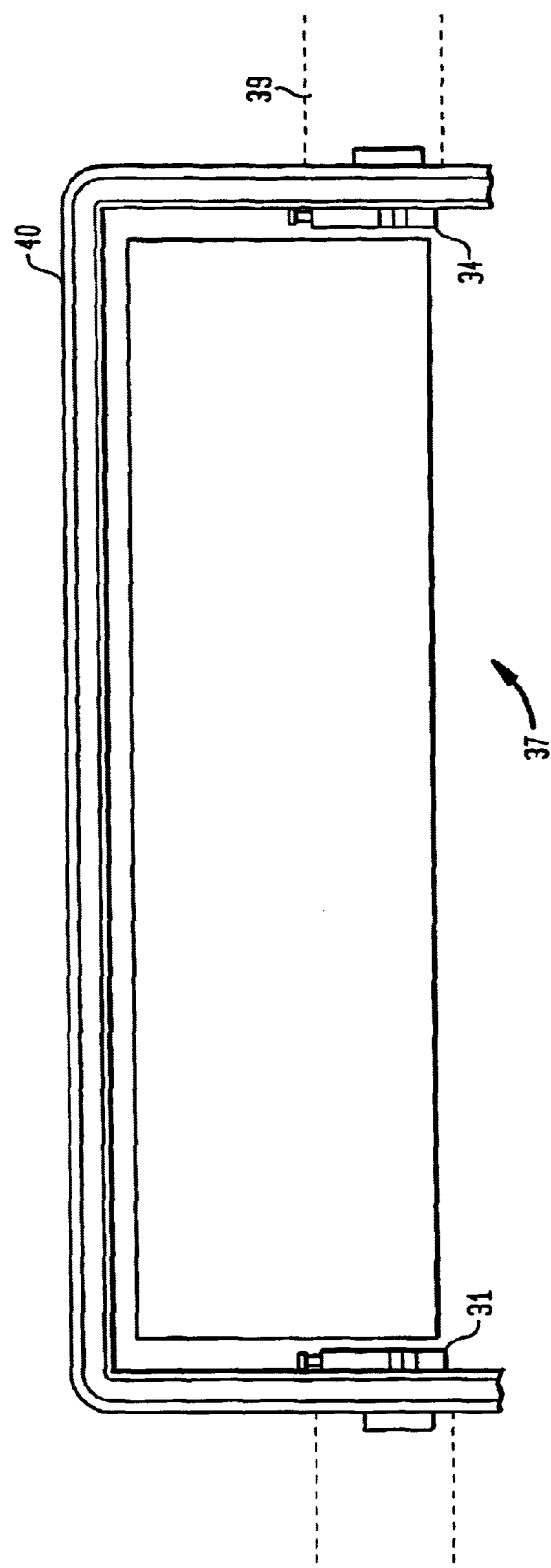

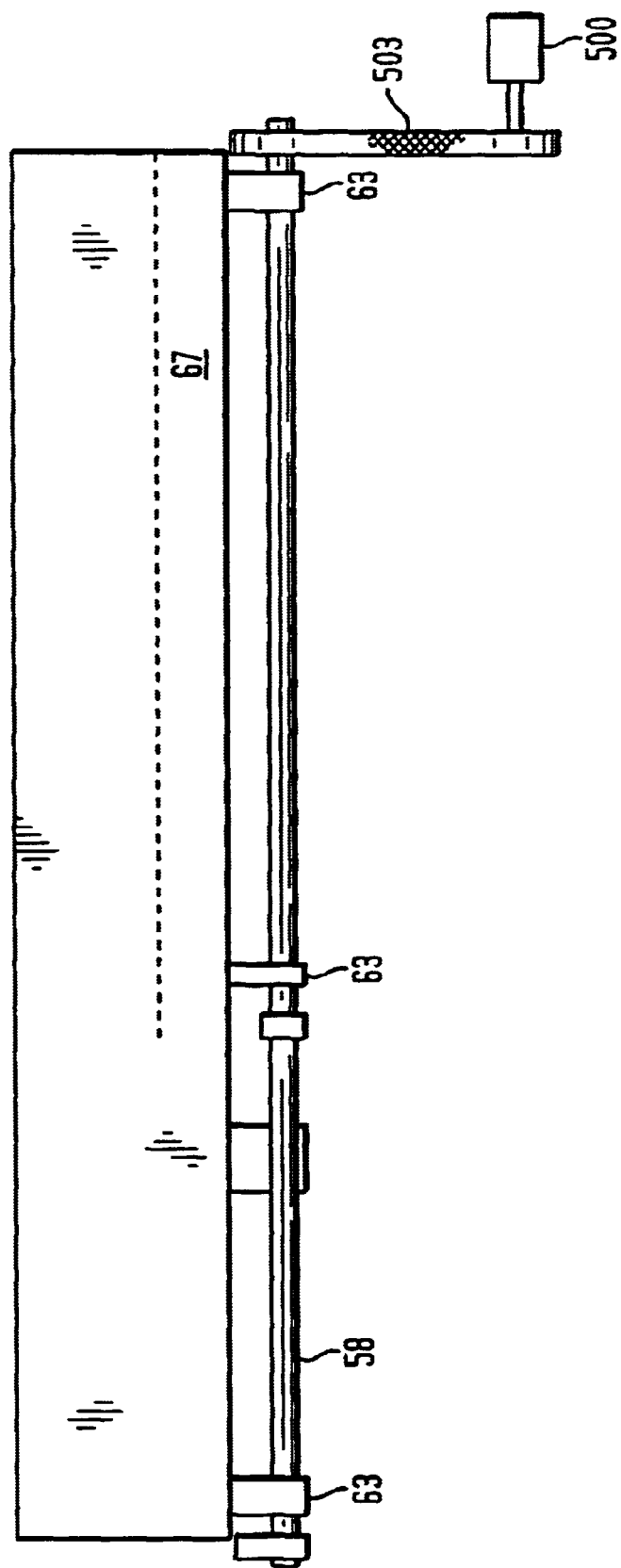

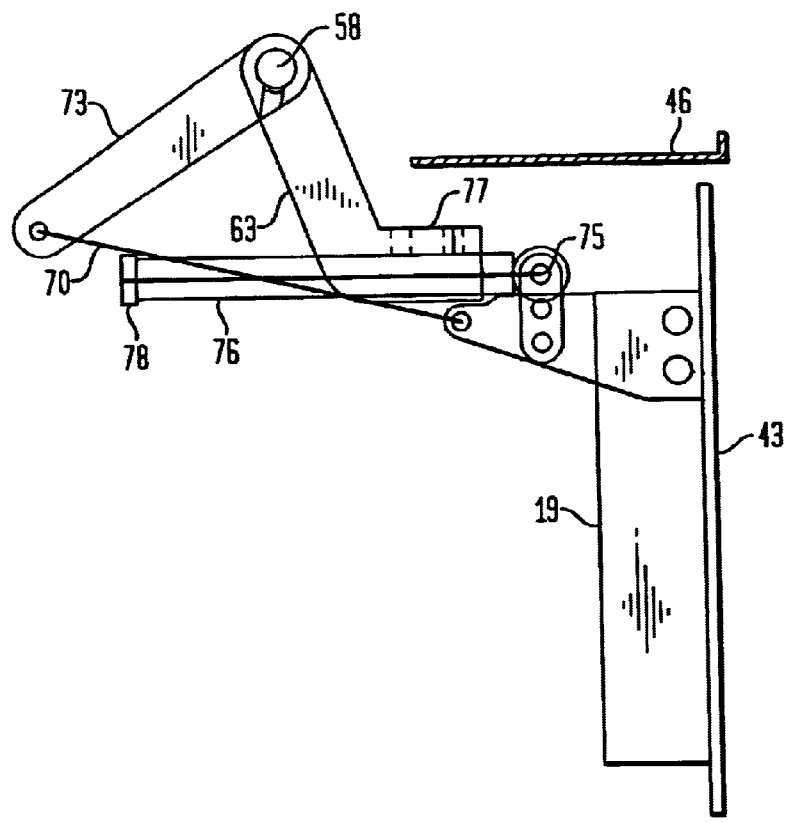
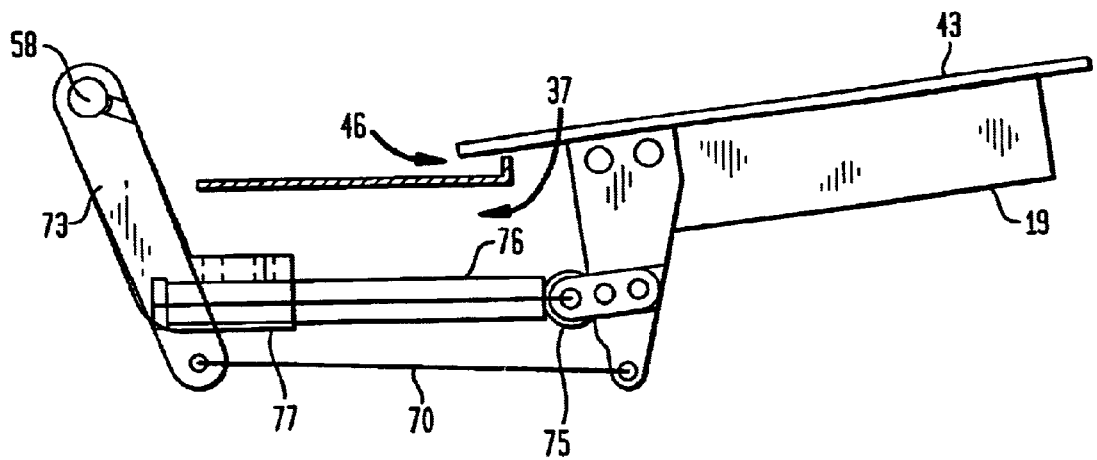

RAISED HATCH DOOR SYSTEM

CROSS-REFERENCE TO RELATED APPLICATION

The present application claims priority based on U.S. Provisional Application No. 60/299,336 filed on Jun. 19, 2001.

FIELD OF THE INVENTION

The present invention pertains generally to vehicles that are modified for use by individuals that are not ambulatory, and pertains specifically to a raised hatch door system to be used with pivoting side doors of a van.

BACKGROUND OF THE INVENTION

In order to provide for improved transportation for individuals that are not completely ambulatory, vans have been provided with spaces to accommodate wheelchairs and powered wheelchair lifts for raising and loading the wheelchair from the ground through the side doors into the van. In order to accommodate a wheelchair lift and a wheelchair, the roof of a standard van is typically raised.

For a standard van, the opening on the side is provided with a pair of doors that open outward and are pivotally attached to the sides of the opening by standard door hinges. The doors typically latch at the top toward the center of a structural header disposed above the opening. The doors also typically latch to each other along their midportion.

In order to increase the height from the floor of the van to the top of the opening to provide for greater headroom inside the van, the factory installed structural header is cut and a new section of the header is added. The new header is typically provided by cutting the factory header and then welding a U-shaped member between the ends of the factory structural header. The U-shaped member provides the new structural header across the top of the enlarged opening in the side of the van. The latch components from the factory header are then mounted on the new structural header.

In order to match the doors to the larger opening, the practice has been to attach extensions onto the top of the standard van doors. The extensions have been welded onto the tops of the factory doors or attached by other means such as adhesives in the case of extensions constructed out of lighter materials such as fiberglass.

The requirement to modify the standard doors and to move the latches to the new structural header has drawbacks. If the extensions are constructed out of metal and welded, the process is relatively labor intensive and the extensions add extra weight to the doors. This extra weight can lead to problems with the standard door hinges causing the doors to sag over time and as a result to not close properly.

Another drawback to the extended doors is that the repositioning of the latch at the top of the extended doors reduces the structural integrity of the doors in the event of a collision.

What is needed is a hatch door system for an extended height van that engages with standard van doors and that provides a structural header similar to a factory header when the hatch door is in the closed position.

SUMMARY OF THE INVENTION

The present invention meets the above-described need by providing a hatch door that engages with standard van doors and that, in the closed position, provides a structural header that is similar to a factory header.

BRIEF DESCRIPTION OF THE DRAWINGS

The invention is illustrated in the drawings in which like reference characters designate the same or similar parts throughout the figures of which:

FIG. 3 is a front elevational view of the opening in the van for the hatch door with the hatch door removed;

FIG. 4c is another alternate embodiment of the mechanism that rotates the shaft;

FIG. 5 is a side elevational view of the mechanism that operates the hatch door shown with the door in the closed position;

FIG. 6 is a side elevational view of the mechanism that operates the hatch door shown with the door in the open position;

DETAILED DESCRIPTION

Figure 1:
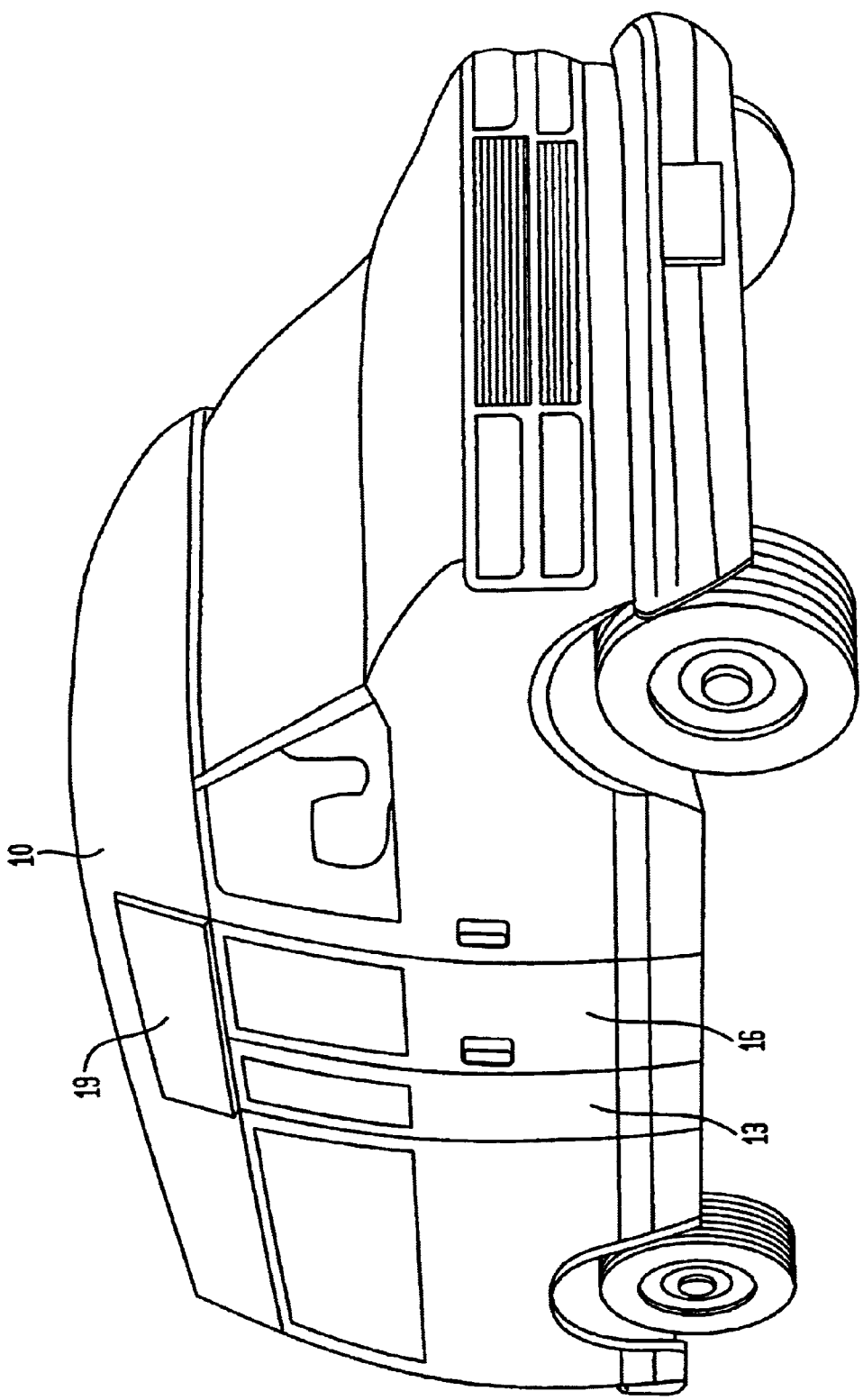
FIG. 1 is a perspective view of a van equipped with the raised hatch door system of the present invention.
Figure 2:
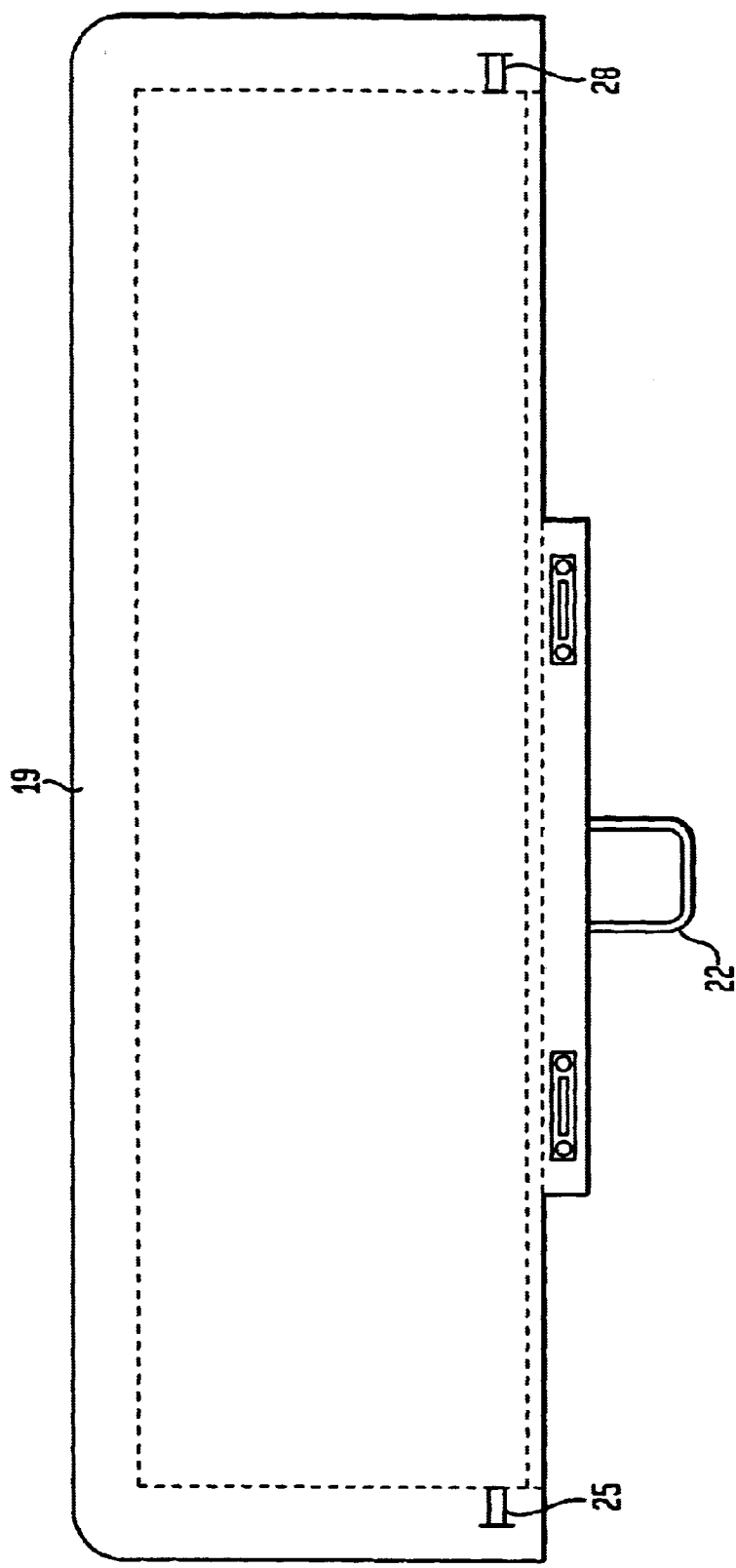
FIG. 2 is a front elevational view of the hatch door of the present invention in the closed position.

Referring to FIGS. 1–7 and initially referring to FIG. 1, a van 10 has been modified for use by individuals that are not completely ambulatory. Vans that are taken from the original equipment manufacturers and modified for special purposes are referred to generically as conversion vans. Specifically, the van 10 has been modified to accommodate a wheelchair. In order to accommodate the wheelchair and a wheelchair lift, the roof of the van is typically raised by cutting off the original roof and replacing it with an extended height roof shell as known to those of skill in the art. In order to match the factory installed doors 13 and 16 to the opening created by the raised roof, the present invention provides a hatch door 19 having a latch component in the form of a hook 22 (FIG. 2). The hatch door 19 is positioned such that the hook 22 aligns with the cooperating latch members on the factory doors 13 and 16 when the hatch door is in the closed position as shown in FIG. 2.

As shown in FIGS. 2 and 3, the hatch door 19 has a pair of latch posts 25, 28 disposed on opposite sides. The latch posts 25, 28 engage with latches 31 and 34 disposed on opposite sides of the opening 37 in the side of the van. As shown in FIG. 3, the factory header 39 is cut in order to raise the door opening. A U-shaped member 40 is welded to define the opening 37 after cutting the factory header 39. The hatch door 19 is designed so as to engage with the sides of the opening 37 by means of latch posts 25, 28 and latches 31, and 34 in approximate alignment with the factory header. Accordingly, when the hatch door 19 is closed and the doors 13 and 16 are locked into position by the latches 31, 34; the system provides a substantially reconstituted factory header with a latch position that is in the normal position for the factory doors. As a result, the present invention provides for a certain amount of structural rigidity, when the doors are closed, that is not possible with other designs. Also, the hatch door system of the present invention provides for use of standard doors that are readily available from the van manufacturers and are easily installed to replace worn or damaged doors.

Turning to FIGS. 4A–6, the hatch door 19 of the present invention is operated by a mechanism that imparts a complex motion. The hatch door 19 is moved from the closed to the open position by a first stage of substantially translatory motion followed by a second stage of substantially rotational motion. In order to avoid water leaking from the hatch door 19 down into the inside of the van 10, the top edge 43 (FIG. 6) of the hatch door 19 has to be rotated to a position above the opening 37 so that water running off of the hatch door 19 will be directed into the rain gutter 46.

Figure 4A:
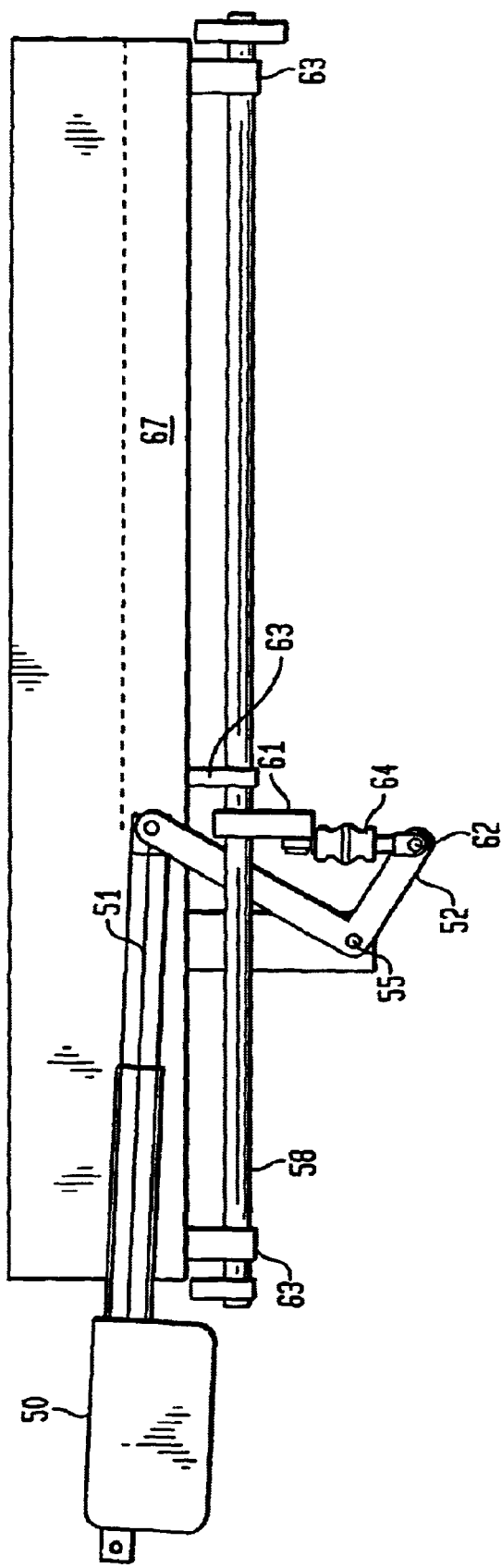
FIG. 4A is a top plan view of the mechanism that rotates the shaft.
Figure 4B:
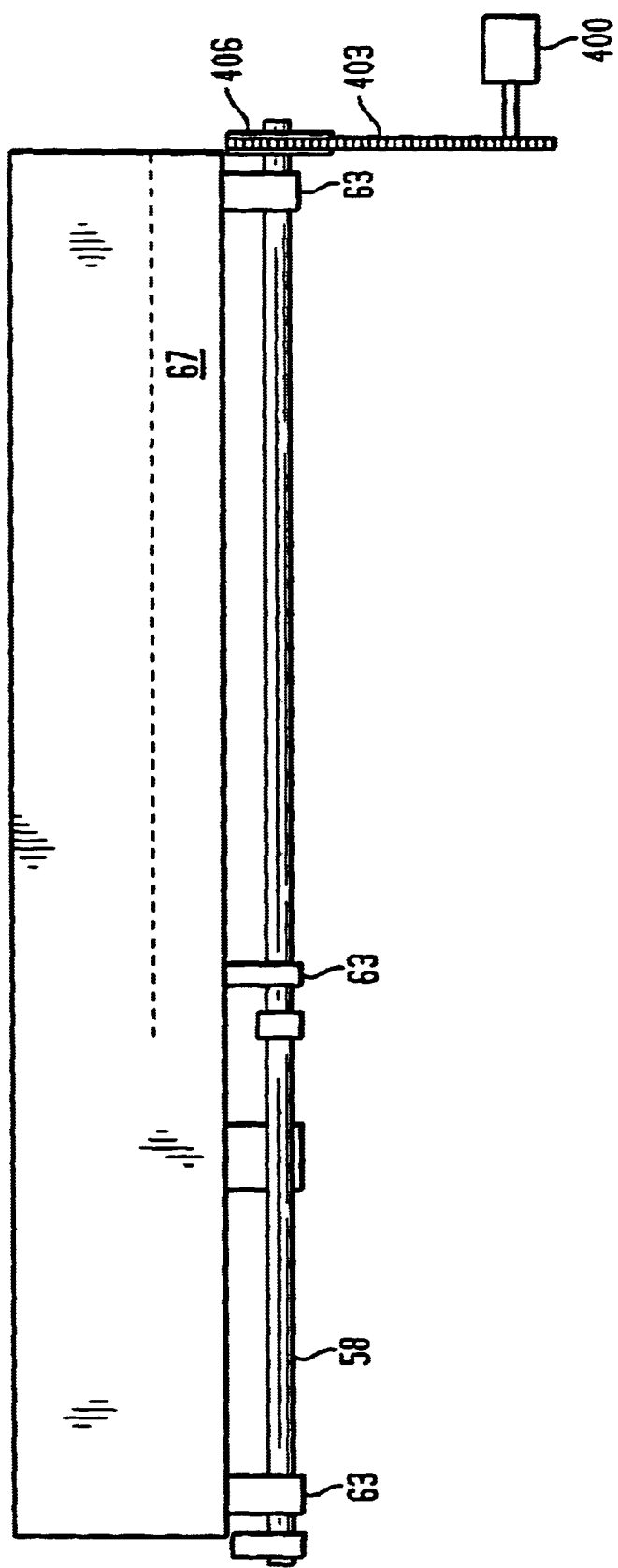
FIG. 4b is an alternate embodiment of the mechanism that rotates the shaft.

FIG. 4A, the mechanism for driving the shaft 58 is shown. For clarity, the linkage connected to the door 19 is removed from FIG. 4A (The linkage connected to the door 19 is described in detail below in connection with FIGS. 5–7). A linear actuator 50 having a reciprocating shaft 51 is connected to a bell crank 52. The bell crank 52 pivots about a pivot point 55. The bell crank 52 rotates a shaft 58 through a linkage. The linkage includes a crank 61 fixedly attached to the shaft 58 and a connecting rod 64 that connects the bell crank 52 to the crank 61 on the shaft. Although the mechanism is shown with a bell crank 52 operated by a linear actuator 50, it will be apparent to those of ordinary skill in the art that there are other arrangements for rotating shaft 58. For example, the shaft 58 could be driven directly by a motor and gear box combination. Also, as shown in FIGS. 4B and 4C, the shaft 58 could be chain driven or belt driven. In FIG. 4B, a motor 400 drives a chain 403 that connects to the shaft 58 by means of a sprocket 406. In FIG. 4c, a motor 500 drives a belt 503. The shaft 58 could be driven at one or both ends or could be driven from the center. There are many possibilities for rotating the shaft 58 and the present invention is not limited to the linear actuator 50 and bell crank 52 arrangement shown in the drawings. The type of drive that is selected will depend on many variables including space, power, and safety considerations. One advantage of the arrangement shown is that the linkage can be easily disconnected by means of a pin 62 that can be removed to operate the door 19 manually.

As shown in FIGS. 4A–4C, the rotating shaft 58 is supported in three places by supports 63 that are fixedly attached to the structural member 67 that is disposed above the hatch door opening.

Turning to FIG. 5, the hatch door 19 is connected to the rotating shaft 58 by means of a first link 70 (shown schematically) that is connected to a second link 73. The door 19 is pivotally attached by a pivot 75 to the end of a sliding rod 76. The sliding rod 76 slides inside a sleeve 77 forming a horizontal guide that is fixedly attached to the structural member 67. The door 19 is shown in the closed position in FIG. 5. When shaft 58 is rotated counterclockwise with respect to the orientation of FIG. 5 by operation of the linear actuator 50 and bell crank 52, the second link 73 also rotates counterclockwise. Because of the angle between the first link 70 which is substantially horizontal and the door 19, the door 19 initially moves outward from the closed position in a substantially translatory motion. The translatory motion continues until a stop in the form of a flange 78 on the sliding rod 76 engages with the end of the stationary sleeve 77. Once the flange 78 engages with the end of the sleeve 77, the sliding rod 76 cannot move any farther forward (to the right with respect to the orientation of the figures). At this point, further rotation of shaft 58, causes the first link 70 to rotate the door 19 about the pivot 75.

Although the device is shown with a shaft disposed through a tubular sleeve 77, other linear guiding devices would also be suitable such as rails and cooperating members or the like. Also, the reciprocating shaft 76 may be provided with a suitable bearing to reduce any chatter that may develop during its motion.

In FIG. 6, the final position of the door 19 is shown. The second link 73 has caused the door 19 to be rotated about its pivot point 75 such that the door 19 makes an approximately six degree angle with the horizontal and is positioned such that water running off of the door 19 will enter the rain gutter 46 on the vehicle and will be carried away. The amount of travel of the door 19 is adjusted by adjusting the rotation of the shaft 58 through the linear actuator 50 and the bell crank 52. The length of travel of the linear actuator 50 determines the amount of rotation of shaft 58.

Figure 7:
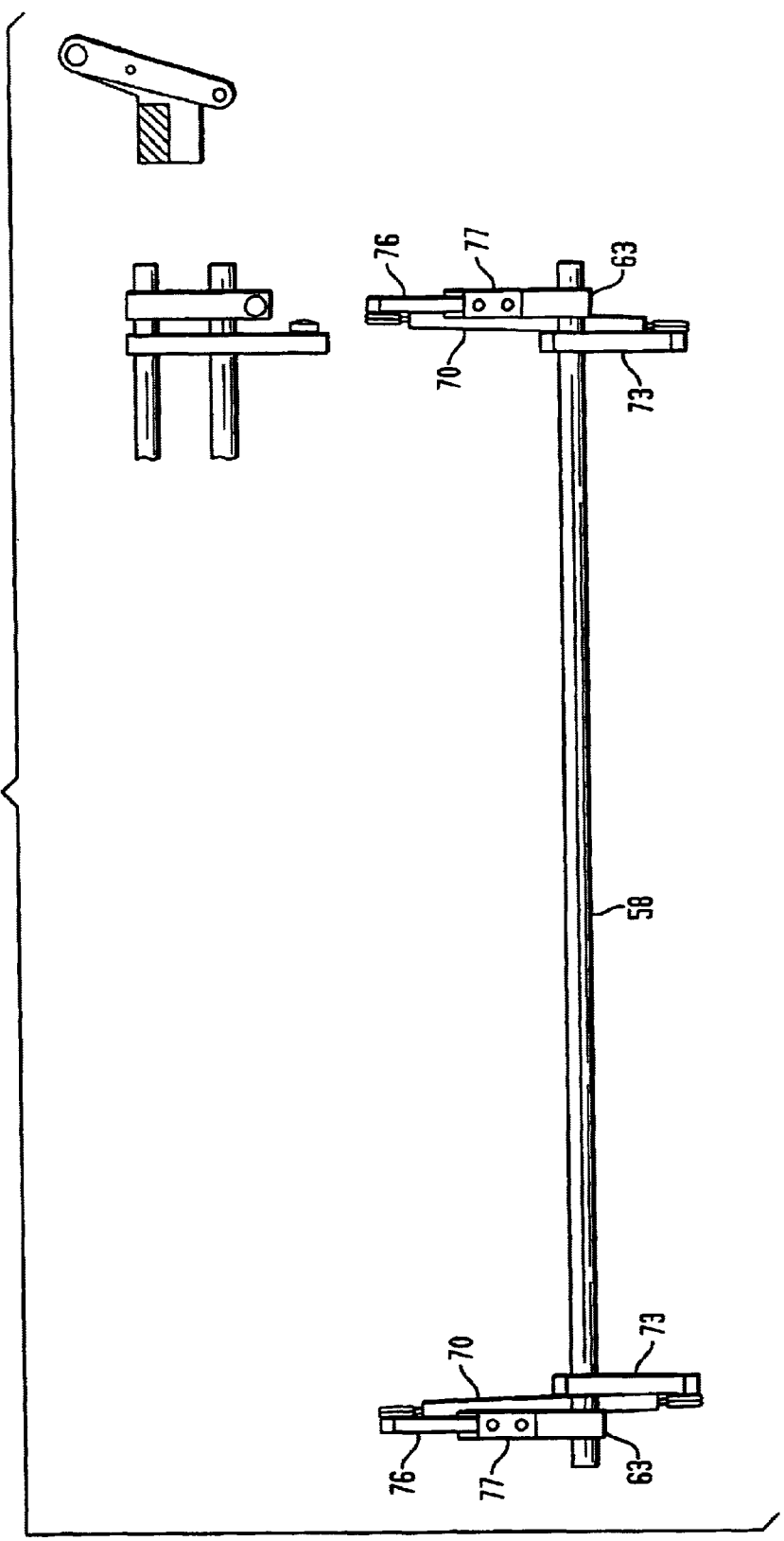
FIG. 7 is a bottom plan view of the door mechanism with the door open.

In FIG. 7, the linkage connected to the door 19 is shown in relation to the shaft 58 and supports 63. As shown, the sleeve 77 is integrally formed as a part of the support 63 at the opposite ends of the device. The central support 63 (FIGS. 4A–4C) may or may not be required and would not include a sleeve 77. The sleeve 77 and support 63 are integrally formed at the ends for ease of installation of the device, however, they may be separate parts that are separately attached to the vehicle.

Figure 8:
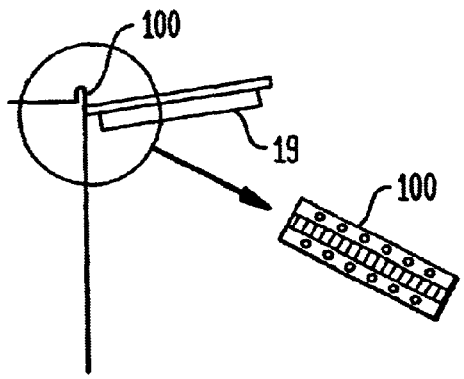
FIG. 8 is a side elevational view of an alternate embodiment of the hinge for the hatch door system of the present invention.

In FIG. 8, an alternate embodiment of the hinge for the hatch door is shown. The hatch door 19 is pivotally attached to the vehicle by a piano hinge 100. While the piano hinge 100 provides many of the benefits of the invention, it limits the ability to form a weather tight seal. When the door 19 is in a raised position, water may come through the hinge itself into the vehicle or the doorway.

Figure 9:
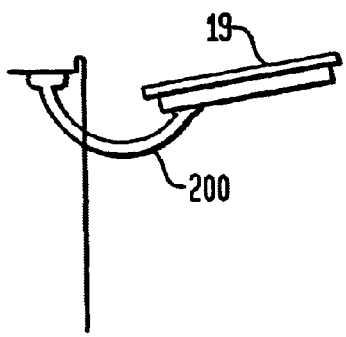
FIG. 9 is a side elevational view of another alternate embodiment of the hinge for the hatch door system of the present invention; and, FIG. 10 is a side elevational view of yet another alternate embodiment of the hinge for the hatch door system of the present invention.

Turning to FIG. 9, another alternate embodiment provides a trunk or hood style hinge 200. In the open position shown, water will run down the door 19 into the vehicle or the door way.

Figure 10:
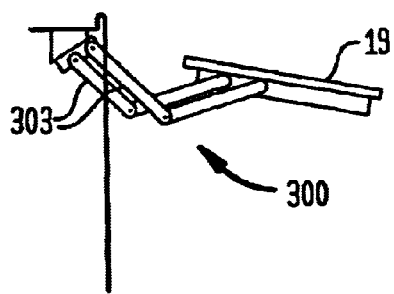

In FIG. 10, yet another alternate embodiment provides a scissors style hinge 300. This hinge 300 limits the extent to which the door can be raised for necessary headroom clearance. In particular, hinge members 303 extend downward reducing the available headroom.

For each of the alternate embodiments for the hinge, the hatch door would pivot inside the structural member 40 and would attach on opposite sides of the opening 37 to latches 31 and 34 by means of latch posts 25, 28 or the like. The first end of the hatch door 19 would also include a latch member 22 for engaging with the standard latches on the factory side doors.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention.

What is claimed is:

1. A hatch door system for a van having a pair of outwardly pivoting side doors and an elevated ceiling forming an enlarged side opening, the hatch door system, comprising:

a structural member disposed around a portion of the enlarged side opening; and, a hatch door pivotally attached to the vehicle, the hatch door disposed within the structural member, and the hatch door capable of pivoting between an open position and a closed position, the hatch door having a first latch disposed at a first end, the first latch being capable of engaging with cooperating latch members disposed on the pair of outwardly pivoting side doors, wherein the first end of the hatch door has a pair of second latches that engage with cooperating latch members disposed on the structural member and wherein the second latches on the first end of the door are substantially aligned with a factory installed header when the door is in the closed position.

2. The hatch door system of claim 1, wherein the hatch door is pivotally attached to the vehicle by means of a piano hinge.

3. The hatch door system of claim 1, wherein the hatch door is pivotally attached to the vehicle by means of a trunk-style hinge.

4. The hatch door system of claim 1, wherein the hatch door is pivotally attached to the vehicle by means of a scissors hinge.

5. The hatch door system of further claim 1, further comprising hinge means for pivotally attaching the hatch door to the vehicle.

6. A hatch door system for a van having a pair of outwardly pivoting side doors and an elevated ceiling forming an enlarged side opening, the hatch door system, comprising:

a horizontally disposed sliding member having a first end and a second end;

a door pivotally attached to the sliding member, the door having a latch capable of engaging with latch members on the pair of outwardly pivoting side doors;

a first link attached to the door;

a stop disposed on the sliding member;

a horizontal guide mounted to the vehicle and slidingly receiving the sliding member; and, wherein the first link moves the door in substantially translatory motion in a first direction until the stop prohibits further movement of the sliding member in the first direction and then further movement of the first link in the first direction causes the door to rotate about its pivot point on the sliding member.

7. The door hatch system of claim 6, wherein the door is pivotally attached to the second end of the sliding member.

8. The door hatch system of claim 6, wherein the stop is disposed at the first end of the sliding member.

9. The door hatch system of claim 6, wherein the first link is disposed substantially horizontally.

10. The door hatch system of claim 6, wherein the first link reciprocates by means of a second link attached to a rotating shaft.

11. The door hatch system of claim 10, wherein the shaft is rotated by a bell crank.

12. The door hatch system of claim 11, wherein the bell crank is driven in reciprocating fashion by a linear actuator.

13. A hatch door system for a van having a pair of outwardly pivoting side doors and an elevated ceiling forming an enlarged side opening, the hatch door system, comprising:

a horizontally disposed sliding member having a first end and a second end;

a door pivotally attached to the second end of the sliding member, the door having a latch capable of engaging with latch members on the pair of outwardly pivoting side doors;

a first horizontally disposed link attached to the door;

a stop disposed at the first end of the sliding member;

a horizontal guide mounted to the vehicle and slidingly receiving the sliding member;

a second link attached to the first link;

a rotating shaft connected to the second link;

a drive mechanism connected to the shaft; and, wherein the first link moves the door in substantially translatory motion in a first direction until the stop prohibits further movement of the sliding member in the first direction and then further movement of the first link in the first direction causes the door to rotate about its pivot point on the sliding member.

14. The hatch door system of claim 13, wherein the drive mechanism comprises a chain drive.

15. The hatch door system of claim 13, wherein the drive mechanism comprises a belt drive.

16. The hatch door system of claim 13, wherein the drive mechanism comprises a bell crank and a linear actuator.

17. The hatch door system of claim 13, further comprising a bearing disposed adjacent to the sliding member.

18. The door hatch system of claim 16, wherein the bell crank is connected to the linear actuator at a first end and is connected to a connecting rod at the second end.

19. The door hatch system of claim 18, further comprising a removable pin for connecting the bell crank to the connecting rod.

* * * * *